United States Patent [19]
Hornbaker et al.

[11] 3,932,336
[45] Jan. 13, 1976

[54] EMULSION POLYMERIZATION OF VINYL BROMIDE WITH VINYL COMONOMER

[75] Inventors: Edwin D. Hornbaker; Bryan Sparks, both of Baton Rouge, La.

[73] Assignee: Ethyl Corporation, Richmond, Va.

[22] Filed: Nov. 21, 1973

[21] Appl. No.: 417,887

Related U.S. Application Data

[63] Continuation-in-part of Ser. No. 299,250, Oct. 20, 1972, Pat. No. 3,864,297, which is a continuation-in-part of Ser. No. 147,620, May 27, 1971, abandoned.

[52] U.S. Cl. ...... 260/29.6 R; 260/23 XA; 260/27 R; 260/29.6 MM; 260/29.6 MQ; 260/29.6 MP; 260/85.7; 260/87.7; 260/86.3; 260/87.5 R
[51] Int. Cl.² ......................................... C08L 27/10
[58] Field of Search .... 260/29.6 R, 92.8 R, 92.8 W, 260/29.6 H, 29.6 MQ, 29.6 MM

[56] References Cited
UNITED STATES PATENTS

| | | | |
|---|---|---|---|
| 2,462,422 | 2/1949 | Plambeck | 260/92.8 W |
| 3,485,811 | 12/1969 | Levine | 260/92.8 W |
| 3,523,111 | 8/1970 | Bibeau et al. | 260/92.8 W |

FOREIGN PATENTS OR APPLICATIONS

| | | |
|---|---|---|
| 1,102,108 | 2/1968 | United Kingdom |

OTHER PUBLICATIONS

Sweeting–The Science and Technology of Polymer Films, Vol. 1, 1968, p. 64.

*Primary Examiner*—Harold D. Anderson
*Attorney, Agent, or Firm*—Donald L. Johnson; John F. Sieberth; David L. Ray

[57] ABSTRACT

A process for producing substantially colorless poly(vinyl bromide) homopolymer and copolymer latexes at high rates and in high yields which includes adding an aqueous solution of a reducing agent to an emulsion of vinyl bromide containing a water-soluble peroxide, or adding an aqueous solution of peroxide to an emulsion of vinyl bromide containing a water-soluble reducing agent. The latexes can be dried without significant color development and the poly(vinyl bromide) homopolymers and copolymers obtained therefrom have improved color stability.

28 Claims, No Drawings

EMULSION POLYMERIZATION OF VINYL BROMIDE WITH VINYL COMONOMER

CROSS REFERENCE TO RELATED APPLICATIONS

This application is a continuation-in-part of application Ser. No. 299,250, filed Oct. 20, 1972, now U.S. Pat. No. 3864297, which is a continuation-in-part of application Ser. No. 147,620, filed May 27, 1971, now abandoned.

BACKGROUND OF THE INVENTION

Many products commonly used by the consumer ignite quite readily when exposed to high temperatures. Typical of such products are articles of clothing, various products covered with fabrics, paper goods, products made from wood and plastic, and many others. Disposable soft goods in particular, burn easily.

It is known that various materials can be rendered flame-retardant by treating them with various bromine-containing compounds. Most of the bromine-containing compounds suggested for use in flame-proofing are organic compounds. These compounds have been found to have certain deficiencies; i.e., they are volatile, do not have sufficient resistance to laundering, exude from substrates to which they are applied, and sometimes cause dermatological problems. Thus, there is a need to provide a flame-retarding, bromine-containing compound which overcomes the above deficiencies.

It is well known that poly(vinyl bromide) can be prepared by the free radical innitiated polymerization of vinyl bromide. However, the reaction proceeds very slowly when conventional methods of initiating polymerization are employed, and impractically low conversions of monomer to polymer are obtained. Attempts have been made to achieve more rapid polymerization of vinyl bromide and to obtain high yields by using relatively large amounts of free radical initiators and by carrying out the reaction for long periods of time. However, the polymers obtained in such cases are colored, which is indicative of poor thermal stability. For example, Ulinska and Mankowski, Studia Soc. Sci. Torun, Sect. B., Vol. 2, No. 2 (1960), report that emulsion polymerization of vinyl bromide at 50°C for 6 hours using 1.5 percent of potasium persulfate as free radical initiator gave only a 69 percent yield of a yellow polymer. They also report an 88 percent yield of polymer with the same initiator concentration after a reaction time of 24 hours, and that the product obtained after drying was dark brown. They were able to obtain essentially colorless polymers in very low yields (3 to 14 percent) in short reaction times (6 hours) by solution polymerization, but attempts to improve yields by increasing the reaction time gave brown products.

THE INVENTION

In accordance with the present invention, substantially colorless poly(vinyl bromide) homopolymer and copolymer latexes are produced at high rates and in high yields by adding an aqueous solution of a reducing agent to an emulsion of vinyl bromide monomer containing a water-soluble peroxidic compound or by adding an aqueous solution of a peroxide to an emulsion of vinyl bromide monomer containing a water-soluble reducing agent. The latexes can be dried without significant color development and the poly(vinyl bromide) homopolymers and copolymers obtained therefrom have improved thermal stability.

As is well known in the art, a polymer latex is an emulsion of a polymer in water. The latex is prepared by mixing the monomer with water and polymerizing which produces the polymer emulsion.

Latex particle size of the homopolymers and copolymers of the present invention may range from about 0.03 to about 1.5 microns, preferably 0.05 to 1.0 microns. The latexes of the present invention can contain any desired amount by weight poly(vinyl bromide) homopolymer or copolymer solids, preferably from about 20 to about 60 percent, more preferably about 30 to about 60 percent.

In the process of the present invention, control of the rate of free radical production is extremely critical. On the one hand, the rate of radical production must be sufficiently high to provide a practical reaction rate, and thus, a reasonable overall reaction time. However, the rate of radical production must be low enough to avoid the formation of a partially degraded polymer having poor color and thermal stability. In addition, within the acceptable range of radical generation rates, the supply of radicals produced at a given rate must be maintained for a sufficient period of time to provide a high conversion of monomer to polymer.

The proper rate of radical generation can be selected by appropriate choice of the rate of addition of reducing agent and the concentration of peroxidic compound in the case where the water-soluble peroxidic compound is dissolved in the aqueous phase, or alternatively, by the proper choice of the rate of addition of peroxidic compound and the concentration of reducing agent in the case where the reducing agent is dissolved in the aqueous phase. The preferred rate of addition of reducing agent (or alternatively, peroxidic compound) will depend upon the concentration of the peroxidic compound (or alternatively, reducing agent) in the aqueous phase, the manner of addition of the reducing agent (i.e., whether it is added continuously or in portions), the chemical nature of the reducing agent and the peroxidic compound, and the reaction temperature. For convenience, we therefore define the rate of radical production in terms of the rate of continuous addition of an exemplary reducing agent, sodium sulfite, and the concentration of an exemplary peroxidic compound, ammonium persulfate, used in the examples given herein. Also for convenience, we specify the addition rates and concentrations for a reaction temperature of 50°C. The proper rates of addition and concentrations for other reducing agent-peroxidic compound combinations required to produce the acceptable radical generation rates as specified herein can readily be determined by consideration of the equivalent weights of the other reducing agent-peroxidic compound combinations. The equivalent weight of a compound is defined as the molecular weight of the compound divided by the change in oxidation number per molecule in the particular oxidation-reduction reaction under consideration. For example, in the reaction between ammonium persulfate and sodium sulfite,

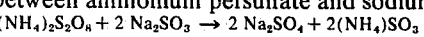

sulfur undergoes a change in oxidation number from +7 in persulfate to +6 in sulfate. Since two atoms of sulfur undergo this change of one unit, the equivalent weight of ammonium persulfate is one-half the molecular weight. The equivalent weight of sodium sulfite is equal to the molecular weight. Thus, if one equivalent of ammonium persulfate and one equivalent of sodium sulfite were being used to initiate polymerization and it was desired to use a different initiator system, one would merely use one equivalent of the different peroxidic compound and one equivalent of the different reducing agent. The equivalent weights of the different peroxidic compounds and reducing agent, and thus the actual weights of each material to be used, would be obvious from a consideration of the particular oxidation-reduction reaction which they undergo when they interact.

As will be illustrated by the examples, the preferred range of radical generation rates required to produce the polymers of this invention is defined at the lower limit by the radical generation rate obtained by continuously adding an aqueous sodium sulfite solution at a rate of about $2.8 \times 10^{-4}$ of sodium sulfite per hour per hundred parts by weight of monomer to an aqueous emulsion of vinyl bromide monomer at about 50°C containing about 7 parts per million of cupric sulfate (based on the weight of monomer), and about $1.5 \times 10^{-3}$ equivalent of ammonium persulfate per hundred parts by weight of monomer. The upper limit of the radical generation rate is defined by the rate obtained by continuously adding an aqueous sodium sulfite solution at the rate of about $8.7 \times 10^{-4}$ equivalent of sodium sulfite per hour per hundred parts by weight of monomer to an aqueous emulsion of vinyl bromide monomer at about 50°C containing about 7 parts per million of cupric sulfate (based on weight of monomer), and about $4.6 \times 10^{-3}$ equivalent of ammonium persulfate per hundred parts by weight of monomer. A more preferred range of radical generation rates is, at the lower limit, that provided by continuously adding about $3.2 \times 10^{-4}$ equivalent of sodium sulfite per hour per hundred parts by weight of monomer to an aqueous emulsion of vinyl bromide monomer at about 50°C containing about 7 parts per million of cupric sulfate and about $2.2 \times 10^{-3}$ equivalent of ammonium persulfate per hundred parts by weight of monomer and, at the upper limit, that provided by continuously adding about $7.1 \times 10^{-4}$ equivalent of sodium sulfite per hour per hundred parts by weight of monomer to an aqueous emulsion of vinyl bromide monomer at about 50°C containing about 7 parts per million of cupric sulfate and about $3.9 \times 10^{-3}$ equivalent of ammonium persulfate per hundred parts by weight of monomer. In the embodiment of this invention wherein the peroxidic compound is added to the aqueous emulsion containing the reducing agent, the same preferred ranges of radical generation rates are applicable. The appropriate rate is determined by interchanging the amounts of reducing agent and peroxide. For example, at the lower limit, the radical generation rate would be that obtained by continuously adding an aqueous ammonium persulfate solution at a rate of about $2.8 \times 10^{-4}$ equivalent of ammonium persulfate per hour per hundred parts by weight of monomer to an emulsion of vinyl bromide monomer at about 50°C containing about 7 parts per million, based on the weight of monomer, of cupric sulfate and about $1.5 \times 10^{-3}$ equivalent of sodium sulfite per hundred parts by weight of monomer.

While the preferred rates of radical generation are defined in terms of continuous rates of addition of reducing agent to peroxidic compound or peroxidic compound to reducing agent, and while continuous addition is a desirable procedure for carrying out the process of the present invention, it is also possible to obtain the polymers of the invention by discontinuous addition of either reducing agent or peroxidic compound, as the case may be, so long as the rate of radical generation is maintained within the range specified. However, it is not possible to obtain the polymers of this invention by adding all of both free radicals initiating compounds at the beginning of the polymerization as has been described in the prior art since it is not possible by such a procedure to maintain the desirable radical generation rates for a sufficient length of time to obtain high yields in reasonable reaction times. The reaction time is not critical provided that the radical generation rate is within the preferred range, but it is or course, necessary to conduct the polymerization at a sufficient rate to obtain high yields in reasonable periods of time. Thus, while an upper limit on radical generation rates is imposed by the requirement that a substantially colorless polymer of improved thermal stability be produced, a lower limit is preferred due to the necessity for avoiding impractically long reaction times.

The emulsion of vinyl bromide is prepared by mixing water and vinyl bromide monomer in a ratio of water to monomer ranging from about 0.5 to about 5. A more preferred ratio is from about 0.7 to about 3.0. Although an emulsifier is not essential, it is preferred that an emulsifier is also added to the mixture of vinyl bromide and water to promote emulsification.

To obtain copolymers of vinyl bromide in accordance with the process of the present invention, up to 75 percent by weight, preferably up to about 50 percent by weight, more preferably up to about 25 percent by weight, of the vinyl bromide monomer may be replaced with compounds copolymerizable therewith. Exemplary of a few of the vast number of compounds copolymerizable with vinyl bromide are vinyl acetate; alkyl acrylates such as methyl acrylate, ethyl acrylate, propyl acrylate, and the like; acrylamide monomers; acrylic acid; methacrylic acid; vinyl chloride; vinylidene chloride; glycidyl acrylate, glycidyl methacrylate; hydroxyethyl methacrylate; hydroxypropyl methacrylate; and so on.

The emulsifier may suitably comprise from about 0.5 to about 12 percent by weight, based on the weight of vinyl bromide monomer. A more preferred range is from about 1 to about 8 percent by weight, based on the weight of vinyl bromide monomer.

The emulsifier may be of the anionic, cationic or nonionic type, or mixtures of these types of emulsifiers may be used. Examples of anionic emulsifiers given to illustrate but not limit the invention are sodium dialkyl sulfosuccinates, such as sodium dioctylsulfosuccinate and sodium bis(tridecyl)sulfosuccinate; sodium, potassium or ammonium salts of saturated or unsaturated aliphatic carboxylic acids such as lauric, myristic, palmitic, stearic, oleic or ricinoleic acids; sodium salts of sulfated oils such as castor oil, tall oil, diesel oil or alkyl oleates; sodium salts of alkylaryl sulfonic acids such as linear or branched dodecylbenzenesulfonic acid or isopropylnaphthalene-sulfonic acid; sodium, potassium or ammonium salts of disproportionated rosin or tall oil acids; sodium, potassium or ammonium salts of sulfated unsaturated acids such as oleic, ricinoleic or tall oil acids; sodium, potassium or ammonium alkyl sulfates obtained by sulfonation and subsequent neutralization of linear or branched aliphatic alcohols of the $C_{12}$–$C_{24}$ range, such as sodium lauryl sulfate, sodium tridecyl sulfate or sodium octadecyl sulfate; sodium, potassium or ammonium salts of the sulfonic acids obtained by sulfonation and subsequent neutralization of linear or branched alpha-olefins of the $C_{12}$-$C_{24}$ range; sodium salts of sulfonated esters formed from polyols and unsaturated aliphatic carboxylic acids such as glyceryl trioleate; and the like. Examples of cationic emulsifiers are alkyltrimethylammonium halides such as cetyltrimethylammonium chloride or dodecyltrimethylammonium chloride; acrylamidoalkyldimethyl(2-hydroxyethyl)ammonium salts such as stearamidopropyl-dimethyl-$\beta$-hydroxyethylammonium nitrate; bis(2-hydroxyethyl)octadecylamine oxide; alkyldimethylbenzylammonium chlorides such as lauryldimethylbenzylammonium chloride; and the like. Examples of the nonionic emulsifiers are alkyl phenoxy polyoxyethylene ethanol, fatty acid ethylene oxide condensates, oxyethylated phenols, lanolin, glycerol esters, ethoxylated lanolin, wool wax alcohols, sorbitan esters, polyoxyethylene sorbitol oleate, polyoxyethylene fatty glycerides, polyoxyethylene palmitate, glycerides of fats and oils, fatty alcohol derivatives, fatty acid esters, ethoxylated fatty alcohols, polyoxyethylene lauryl ether, polyoxyethylene stearyl ether, oleic diethanolamide, and the like.

As is well known in the art, a reducing agent is a substance that is readily oxidized (loses a valence electron), and, thereby, reduces another substance (which gains a valence electron). Exemplary of the many reducing agents useful in the present invention are sulfurous acid; ammonium, sodium or potassium sulfite, ammonium, sodium or potassium bisulfite; ammonium, sodium or potassium metabisulfite; ammonium, sodium or potassium hydrosulfite; aldehyde sulfoxylates such as ammonium, potassium or sodium formaldehyde sulfoxylate; ammonium, sodium and potassium thiosulfate, and the like. More preferred reducing agents are the sulfites, bisulfites, metabisulfites, aldehyde sulfoxylates, and thiosulfates of ammonia, sodium, and potassium. The reducing agent may comprise from about 0.002 to about 3.5 percent by weight, based on the total monomer weight. A more preferred range is from about 0.05 to about 1.5 percent by weight, based on the total monomer weight.

In one embodiment of the present invention it is also necessary that a peroxidic compound be included in the vinyl bromide-water emulsion. As is well known in the art, a peroxidic compound is a compound containing the bivalent —O—O— group, where "O" represents an oxygen atom. Exemplary of the many peroxidic compounds useful in the present invention are ammonium, potassium, and sodium persulfates; ammonium, potassium, and sodium perborates, hydrogen peroxide; sodium, potassium, or ammonium salts of peracids such as peracetic acid, perbenzoic acid, succinic acid peroxide or tert-butylperoxymaleic acid. More preferred peroxidic compounds are ammonium persulfate, potassium persulfate and hydrogen peroxide. The peroxide may comprise from about 0.02 to about 3.5 percent by weight, based on the total monomer weight. The more preferred range is from about 0.05 to about 1.5 percent by weight, based on the total monomer weight. In another embodiment of the present invention, the peroxide is not added to the emulsion of vinyl bromide until after a water-soluble reducing agent has been added to the vinyl bromide emulsion.

Although a metal salt is not essential, preferably a metal salt is present in very low concentration, for example 0.01 to 500 ppm, or more preferably 0.05 to about 100 ppm, in the emulsion of vinyl bromide. Examples of suitable salts are: chromium salts such as chromic acetate, chromic chloride, chromic nitrate, chromic sulfate, chromous carbonate, chromous chloride, chromous sulfate; manganese salts such as manganese acetate, manganese ammonium sulfate, manganese benzoate, manganese chloride, manganese carbonate, manganese nitrate, manganese oxalate, manganese phosphate, manganous sulfate, manganic sulfate; iron salts such as sodium iron pyrophosphates, ferric nitrate, potassium ferricyanide, potassium ferrocyanide, ferrous ammonium sulfate, ferrous sulfide, ferric versinate, ferric laurate, ferric chloride, ferric nitrate, ferric oxalate, ferric sulfate, ferric thiocyanate, ferrous acetate, ferrous carbonate, ferrous chloride, ferrous nitrate, ferrous oxalate, ferrous thiosulfate; cobalt salts such as cobaltic chloride, cobaltic sulfate, cobaltic sulfide, cobaltous acetate, cobaltous ammonium sulfate, cobaltous carbonate, cobaltous chloride, cobaltous cyanide, cobaltous ferricyanide, cobaltous nitrate, cobaltous phosphate, cobaltous sulfate, cobaltous sulfite, cobaltous sulfide, potassium cobaltic cyanide, sodium cobaltinitrite; nickel salts such as nickel acetate, nickel ammonium chloride, nickel carbonate, nickel cyanide, nickel ferrocyanide, nickel formate, nickel nitrate, nickel oxalate, nickel ammonia nitrate, nickel sulfate, nickel sulfite, nickel sulfide; copper salts such as cupric acetate, cupric ammonium chloride, cupric ammine sulfate, cupric carbonate, cupric chloride, cupric cyanide, cupric nitrate, cupric oxalate, cupric salicylate, cupric sulfate, cupric sulfide, cupric tartrate, cuprous carbonate, cuprous chloride, cuprous cyanide, cuprous ferricyanide, cuprous sulfide, cuprous sulfite, cuprous thiocyanate; silver salts such as silver acetate, silver carbonate, silver chlorate, silver chloride, silver citrate, silver cyanate, silver cyanide, silver ferrocyanide, silver fluoride, silver nitrate, silver perchlorate, silver sulfate, silver thiosulfate. Preferred salts are those of copper, iron, cobalt and silver.

Additional non-essential ingredients include an antifoam agent in an amount sufficient to keep the emulsion from foaming. Generally only a few drops are required to prevent foaming. Suitable anti-foam agents include silicone compounds, such as dimethyl polysiloxane, copolymers of dimethyl polysiloxane, and polyoxyalkylene ethers, emulsified silicone compounds, tall oil derivatives, blends of mineral oils and silica derivatives, fatty esters, high molecular weight esters, acylated polyamides, polyglycols, fatty acid esters of condensed polyalcohols, fatty acid-ethylene oxide condensates, glycerol esters, ethyl palmitate, acetylenic glycol blends, and the like. Also, about 0.01 to about 500 parts per million (based on the weight of the monomer) of a copper salt such as copper sulfate may be added to promote reaction between the peroxide and the reducing agent, or more preferable from about 0.05 to about 100 parts per million of copper sulfate. Other promoters, such as reducible salts of silver, iron and other transition metals may also be used. A buffer system containing from about 0.05 to about 5 percent by weight, based on the total monomer weight, of $NaH_2PO_4.H_2O$ and from about 0.05 to about 5 percent by weight based on the total monomer weight, of $Na_2HPO_4$ may also be added.

The reaction may be carried out at any temperature from 0° to 75°C. A more preferred range is from 30° to 60°C.

EXAMPLE I

To a 1-liter stainless steel autoclave were charged 0.780 grams of ammonium persulfate, 240 ml of water, 4 drops of Anti-foam 60, which is a silicone anti-foaming agent and is manufactured by General Electric Corp., 12.0 grams of sodium dodecylbenzenesulfonate, 0.50 grams of sodium dihydrogen phosphate monohydrate, 0.51 grams of disodium hydrogen phosphate, and 0.108 ml of a 2 percent copper sulfate pentahydrate solution in water. The autoclave was sealed, pressure tested, and evacuated and flushed three times with nitrogen. About 200 grams of vinyl bromide were charged to the evacuated autoclave, the autoclave was immersed in a bath maintained at 50°C, and stirring was started. When the temperature of the reaction mixture reached 50°C, a solution containing 0.936 gram (0.468 percent on monomer) of sodium sulfite and 30 ml of water was added to the autoclave at a rate of 5 ml per hour. This corresponds to the rate of radical generation provided by adding sodium sulfite at a rate of $6.2 \times 10^{-4}$ equivalent per hour per hundred parts by weight of monomer to an emulsion of vinyl bromide containing $3.4 \times 10^{-3}$ equivalent (0.39 percent) of ammonium persulfate per hundred parts by weight of monomer and 7 parts of cupric sulfate per million parts by weight of monomer. The autoclave was removed from the bath and vented after 6 hours. The reaction product was a white latex containing approximately 157.5 g of poly(vinyl bromide) corresponding to a conversion of 78.8 percent. After drying overnight at 55°C in an air-circulating oven the dry polymer was off-white in color, which shows that the polymer had improved thermal stability in comparison with the emulsion poly(vinyl bromide) described in the prior art.

EXAMPLE II

The reaction was carried out as in Example I with the exceptions that 1.200 grams of ammonium persulfate were used and the 30 ml of sodium sulfite solution contained 1.44 grams (0.72 percent on monomer) of sodium sulfite. This corresponds to the rate of radical generation provided by adding sodium sulfite at a rate of $9.5 \times 10^{-4}$ equivalent per hour per hundred parts by weight of monomer to an emulsion of vinyl bromide containing $5.3 \times 10^{-3}$ equivalent (0.60 percent) of persulfate per hundred parts by weight of monomer and 7 parts of cupric sulfate per million parts by weight of monomer. A purple latex containing 178.5 grams of poly(vinyl bromide), corresponding to a conversion of 89.2 percent, was obtained. After drying overnight at 55°C in an air-circulating oven the dry polymer was dark brown in color. It is apparent from the preceding that the highly discolored latex containing polymer of inferior thermal stability obtained in this example was the result of carrying out the reaction too rapidly, thereby causing an excessively high rate of radical generation. This illustrates the necessity for performing the reaction in such a manner that the rate of radical generation can be carefully controlled.

EXAMPLE III

The reaction was carried out as in Example I with the exception that 225 g of vinyl bromide were used. This corresponds to the rate of radical generation provided by adding sodium sulfite (0.42 percent on monomer) at a rate of $5.5 \times 10^{-4}$ equivalent per hour per hundred parts by weight of monomer to an emulsion of vinyl bromide containing $3.0 \times 10^{-3}$ equivalent (0.347 percent on monomer) of ammonium persulfate per hundred parts by weight of monomer and 7 parts of cupric sulfate per million parts by weight of monomer. The reaction product was a white latex containing 163.9 g of poly(vinyl bromide), corresponding to a conversion of 72.8 percent. After drying overnight at 55°C in an air-circulating oven the dry polymer was off-white in color.

EXAMPLE IV

To a 10-gallon, stainless steel autoclave were charged 18.3 liters of water, 914.0 g of ammonium persulfate (0.62 percent on monomer), 914.0 g of sodium dodecylbenzenesulfonate, 38.1 g of sodium dihydrogen phosphate monohydrate, 38.8 g of disodium hydrogen phosphate, 8.2 ml of 2 percent copper sulfate solution and ca. 25 g of Anti-foam 60. The autoclave was sealed and the stirrer was started and adjusted to a rate of 200 rpm while the mixture was stirred for about 15 minutes. The vessel was pressure tested and then evacuated to a pressure of 3 inches of mercury and flushed three times with nitrogen before 33.5 lbs. of vinyl bromide inhibited with MEHQ* were added. The autoclave was then heated to 50°C and a solution containing 54.8 g of sodium sulfite (0.36 percent on monomer) in a 1-liter of solution was added continuously as indicated below:

*Methyl ether of hydroquinone

During the first hour, 270 ml of solution were added
During the second hour, 322 ml of solution were added
During the third hour, 348 ml of solution were added
During the fourth hour, 373 ml of solution were added
During the fifth hour, 385 ml of solution were added
During the last 24 minutes, 142 ml of solution were added This corresponds to the rate of radical generation provided by adding sodium sulfite to an emulsion of vinyl bromide containing $5.3 \times 10^{-3}$ equivalent of ammonium persulfate per hundred parts by weight of monomer at a rate of $9.8 \times 10^{-4}$ equivalent per hundred parts by weight of monomer per hour. The autoclave was cooled and vented after 5.4 hours. The product was a purple latex. A 100.0 g portion of the latex was dried overnight at 55°C in an air-circulating oven. The dry product, 40.90 g, corresponding to a conversion of 91.4 percent, was brown in color; $\eta_{rel} = 1.132$.

EXAMPLE V

The reaction was run as in Example IV with the exceptions that 59.4 g of ammonium persulfate (0.40 percent on monomer) were charged to the autoclave, the sodium sulfite solution contained 35.6 g of sodium sulfite (0.23 percent on monomer) in 1-liter of solution, and the addition of sulfite solution was carried out as shown below:

During the first hour, 263 ml of solution were added
During the second hour, 232 ml of solution were added
During the third hour, 225 ml of solution were added
During the fourth hour, 268 ml of solution were added
During the fifth hour, 249 ml of solution were added
During the sixth hour, 243 ml of solution were added
During the seventh hour, 247 ml of solution were added During the eighth hour, 257 ml of solution were added.

This corresponds to the rate of radical generation provided by adding sodium sulfite to an emulsion of vinyl bromide containing $3.4 \times 10^{-3}$ equivalent of ammonium persulfate per hundred parts by weight of monomer at a rate of $4.6 \times 10^{-4}$ equivalent per hundred parts by weight of monomer per hour. The autoclave was cooled and vented after 8.0 hours. The product was a white latex. A 100.0 g portion of the latex was dried overnight at 55°C in an air-circulating oven. The dry product, 38.79 g, corresponding to a conversion of 86.4 percent, was off-white in color.

EXAMPLE VI

To a 1-liter stainless steel autoclave were charged 0.780 grams of ammonium persulfate, 240 ml of water, 4 drops of Anti-foam 60, which is a silicone anti-foaming agent and is manufactured by General Electric Corp., 12.0 grams of sodium dodecylbenzenesulfonate, 0.50 grams of sodium hydrogen phosphate monohydrate, 0.51 grams of disodium hydrogen phosphate, and 0.108 ml of a 2 percent copper sulfate pentahydrate solution in water. The autoclave was sealed, pressure tested, and evacuated and flushed three times with nitrogen. About 200 grams of vinyl bromide were charged to the evacuated autoclave, the autoclave was immersed in a bath maintained at 50°C, and stirring was started. When the temperature of the reaction mixture reached 50°C, methyl acrylate was added at the rate of one milliliter every 20 minutes until 15 ml had been added, while a solution containing 0.936 gram (0.468 percent on monomer) of sodium sulfite and 30 ml of water was added to the autoclave at a rate of 5 ml per hour. This corresponds to the rate of radical generation provided by adding sodium sulfite at a rate of $6.2 \times 10^{-4}$ equivalent per hour per hundred parts by weight of monomer to an emulsion of vinyl bromide containing $3.4 \times 10^{-3}$ equivalent (0.39 percent) of ammonium persulfate per hundred parts by weight of monomer and 10 parts of cupric sulfate per million parts by weight of monomer. The autoclave was removed from the bath and vented after six hours. The reaction product was a white latex containing approximately 170.7 g of copolymer corresponding to a conversion of 79.4 percent. The copolymer contained 85.6 percent by weight polymerized vinyl bromide. After drying overnight at 55°C in an air-circulating oven the dry copolymer was off-white in color.

As can be seen from the examples, the novel products, both the latex and the dry product, obtained from the process of the present invention are substantially colorless. As mentioned previously, substantially colorless, or white, products are much more thermally stable than colored products.

The polymers prepared in accordance with the present invention are eminently suitable for use as flame retardants for many materials such as non-woven fabrics, woven fabrics, paper, various types of natural and synthetic polymers, wood, and the like. The poly(vinyl bromide) prepared by the present invention may be applied to the materials mentioned above in latex form by spraying, dipping, padding, coating, and the like, or in powder form by coating, spraying, or by mixing or incorporating the poly(vinyl bromide) in polymers, paper fibers, and the like, prior to forming an object or article from such polymers, fibers, and the like.

What we claim is:

1. A process for the production of poly(vinyl bromide) copolymer latexes from vinyl bromide monomer and a monomer copolymerizable therewith, said monomer copolymerizable therewith being selected from the group consisting of vinyl acetate, methyl acrylate, ethyl acrylate, propyl acrylate, acrylamide, acrylic acid, methacrylic acid, vinyl chloride and vinylidene chloride, wherein up to about 75 percent by weight of said vinyl bromide monomer is replaced with said monomer copolymerizable therewith, comprising adding an aqueous solution of a reducing agent to an emulsion of vinyl bromide monomer containing a water-soluble peroxide compound, wherein said emulsion is at a temperature of from about 0°C to about 75°C, and said aqueous solution of said reducing agent is added to said emulsion at a rate of:
   a. at least about $2.8 \times 10^{-4}$ equivalent of said reducing agent per hour per hundred parts by weight of said monomer, said emulsion containing about $1.5 \times 10^{-3}$ equivalent of a peroxidic compound per hundred parts by weight of said monomer, but
   b. not more than about $8.7 \times 10^{-4}$ equivalent of said reducing agent per hour per hundred parts by weight of said monomer, said emulsion containing about $4.6 \times 10^{-3}$ equivalent of a peroxidic compound per hundred parts by weight of said monomer.
2. The process of claim 1 wherein said reducing agent is sodium sulfite.
3. The process of claim 1 wherein said water-soluble peroxidic compound is ammonium persulfate.
4. The process of claim 1 wherein said emulsion of vinyl bromide contains water and vinyl bromide in a ratio of water to vinyl bromide ranging from about 0.5 to 5.
5. The process of claim 4 wherein said emulsion of vinyl bromide contains from about 0.5 to about 12 percent by weight of an emulsifier based on the weight of vinyl bromide monomer.
6. The process of claim 5 wherein said emulsifier is selected from the group consisting of anionic, cationic and nonionic types of emulsifiers, and mixtures thereof.
7. The process of claim 1 wherein the said reducing agent is selected from the group consisting of sulfurous acid, and sulfites, hydrosulfites, bisulfites, metabisulfites, thiosulfates and aldehyde sulfoxylates of ammonia, sodium, and potassium.
8. The process of claim 1 wherein said reducing agent comprises from about 0.002 to about 3.5 percent by weight, based on the total weight of said vinyl bromide monomer.
9. The process of claim 1 wherein said peroxidic compound is selected from the group consisting of ammonium, potassium and sodium persulfates; ammonium, potassium and sodium perborates; hydrogen peroxide; and ammonium, potassium and sodium salts of percarboxylic acids.
10. The process of claim 9 wherein said peroxidic compound comprises from about 0.02 to about 3.5 percent by weight of said emulsion, based on the total weight of the vinyl bromide monomer.
11. The process of claim 1 wherein said emulsion contains a metal salt.
12. The process of claim 11 wherein said salt is selected from the group consisting of chromium salts, manganese salts, iron salts, cobalt salts, nickel salts, copper salts, and silver salts.

13. The process of claim 1 wherein up to about 25 percent by weight of said vinyl bromide monomer is replaced with said monomer copolymerizable therewith.

14. The process of claim 1 wherein up to about 50 percent by weight of said vinyl bromide monomer is replaced with a compound copolymerizable therewith.

15. A process for the production of poly(vinyl bromide) copolymer latexes from vinyl bromide monomer and a monomer copolymerizable therewith, said monomer copolymerizable therewith being selected from the group consisting of vinyl acetate, methyl acrylate, ethyl acrylate, propyl acrylate, acrylamide, acrylic acid, methacrylic acid, vinyl chloride and vinylidene chloride, wherein up to about 75 percent by weight of said vinyl bromide monomer is replaced with said monomer copolymerizable therewith, comprising adding an aqueous solution of a peroxide to an emulsion of vinyl bromide monomer containing a water-soluble reducing agent, wherein said emulsion is at a temperature of from about 0°C to 75°C, and said aqueous solution of said peroxidic compound is added to said emulsion at a rate of:
  a. at least about $2.8 \times 10^{-4}$ equivalent of said peroxidic compound per hour per hundred parts by weight of said monomer, said emulsion containing about $1.5 \times 10^{-3}$ equivalent of a reducing agent per hundred parts by weight of said monomer, but
  b. not more than about $8.7 \times 10^{-4}$ equivalent of said peroxidic compound per hour per hundred parts by weight of said monomer, said emulsion containing about $4.6 \times 10^{-3}$ equivalent of a reducing agent per hundred parts of said monomer.

16. The process of claim 15 wherein said reducing agent is sodium sulfite.

17. The process of claim 15 wherein said water-soluble peroxidic compound is ammonium persulfate.

18. The process of claim 15 wherein said emulsion of vinyl bromide contains water and vinyl bromide in a ratio of water to vinyl bromide ranging from about 0.5 to 5.

19. The process of claim 18 wherein said emulsion of vinyl bromide contains from about 0.5 to about 12 percent by weight of an emulsifier based on the weight of vinyl bromide monomer.

20. The process of claim 19 wherein said emulsifier is selected from the group consisting of anionic, cationic and nonionic types of emulsifiers, and mixtures thereof.

21. The process of claim 15 wherein the said reducing agent is selected from the group consisting of sulfurous acid, and sulfites, hydrosulfites, bisulfites, metabisulfites, thiosulfates and aldehyde sulfoxylates of ammonia, sodium and potassium.

22. The process of claim 15 wherein said reducing agent comprises from about 0.002 to about 3.5 percent by weight, based on the total weight of said vinyl bromide monomer.

23. The process of claim 15 wherein said peroxidic compound is selected from the group consisting of ammonium, potassium and sodium persulfates; ammonium, potassium and sodium perborates; hydrogen peroxide; and ammonium, potassium and sodium salts of percarboxylic acids.

24. The process of claim 23 wherein said peroxidic compound comprises from about 0.02 to about 3.5 percent by weight of said emulsion, based on the total weight of the vinyl bromide monomer.

25. The process of claim 15 wherein said emulsion contains a metal salt.

26. The process of claim 25 wherein said salt is selected from the group consisting of chromium salts, manganese salts, iron salts, cobalt salts, nickel salts, copper salts and silver salts.

27. The process of claim 15 wherein up to about 25 percent by weight of said vinyl bromide monomer is replaced with said monomer copolymerizable therewith.

28. The process of claim 15 wherein up to about 50 percent by weight of said vinyl bromide monomer is replaced with a compound copolymerizable therewith.

* * * * *